United States Patent [19]

Rosa et al.

[11] 3,929,417

[45] Dec. 30, 1975

[54] APPARATUS FOR THE MANUFACTURE OF POWDERED LIME

[75] Inventors: Josef Rosa, Drasov u Brno; Vlastimil Petr, Brno, both of Czechoslovakia

[73] Assignee: Vyskumny ustav stavebnich hmot, Brno, Czechoslovakia

[22] Filed: July 1, 1974

[21] Appl. No.: 484,571

Related U.S. Application Data

[62] Division of Ser. No. 381,067, July 20, 1973, abandoned.

[52] U.S. Cl. ............... 23/262; 23/279; 209/3; 209/11; 209/12; 209/133; 209/138; 209/142; 423/175; 423/635; 423/636; 432/103; 432/109; 432/106; 432/105; 432/108

[51] Int. Cl.².... C01F 11/06; B07B 9/02; B01J 6/00

[58] Field of Search ...... 23/262, 279; 423/175, 635, 423/636; 432/103, 109, 106, 105, 108, 110; 209/133, 138, 142, 3, 11, 12

[56] References Cited

UNITED STATES PATENTS

| | | | |
|---|---|---|---|
| 2,586,818 | 2/1952 | Harms | 209/138 X |
| 3,284,075 | 11/1966 | Azbe | 432/106 X |

FOREIGN PATENTS OR APPLICATIONS

| | | | |
|---|---|---|---|
| 1,948,467 | 4/1970 | Germany | 423/175 |
| 1,024,994 | 4/1966 | United Kingdom | 423/177 |

*Primary Examiner*—James H. Tayman, Jr.
*Attorney, Agent, or Firm*—Burgess Ryan and Wayne

[57] ABSTRACT

An apparatus for the manufacture of powdered lime of uniform activity comprises means for feeding limestone, ground to a grain size of 0 to 2 mm with a residue on a 2 mm sieve up to 40%, to a rotary kiln by way of a heat exchanger. The kiln has an inclination of about 0.5 to 2.5%. Burnt lime from the output of the kiln is directed to a fluid classifying cell. A fraction of grain size of about 300 to 600 microns from the fluid classifying cell is directed to a separator, as the first part of the product of the apparatus. The residue from the fluid classifying cell is directed to a fluid cooler. Air from the fluid classifying cell, obtained from the separator, is mixed with cool air, the mixture being applied to the fluid cooler for cooling the material therein.

2 Claims, 1 Drawing Figure

U.S. Patent   Dec. 30, 1975   3,929,417
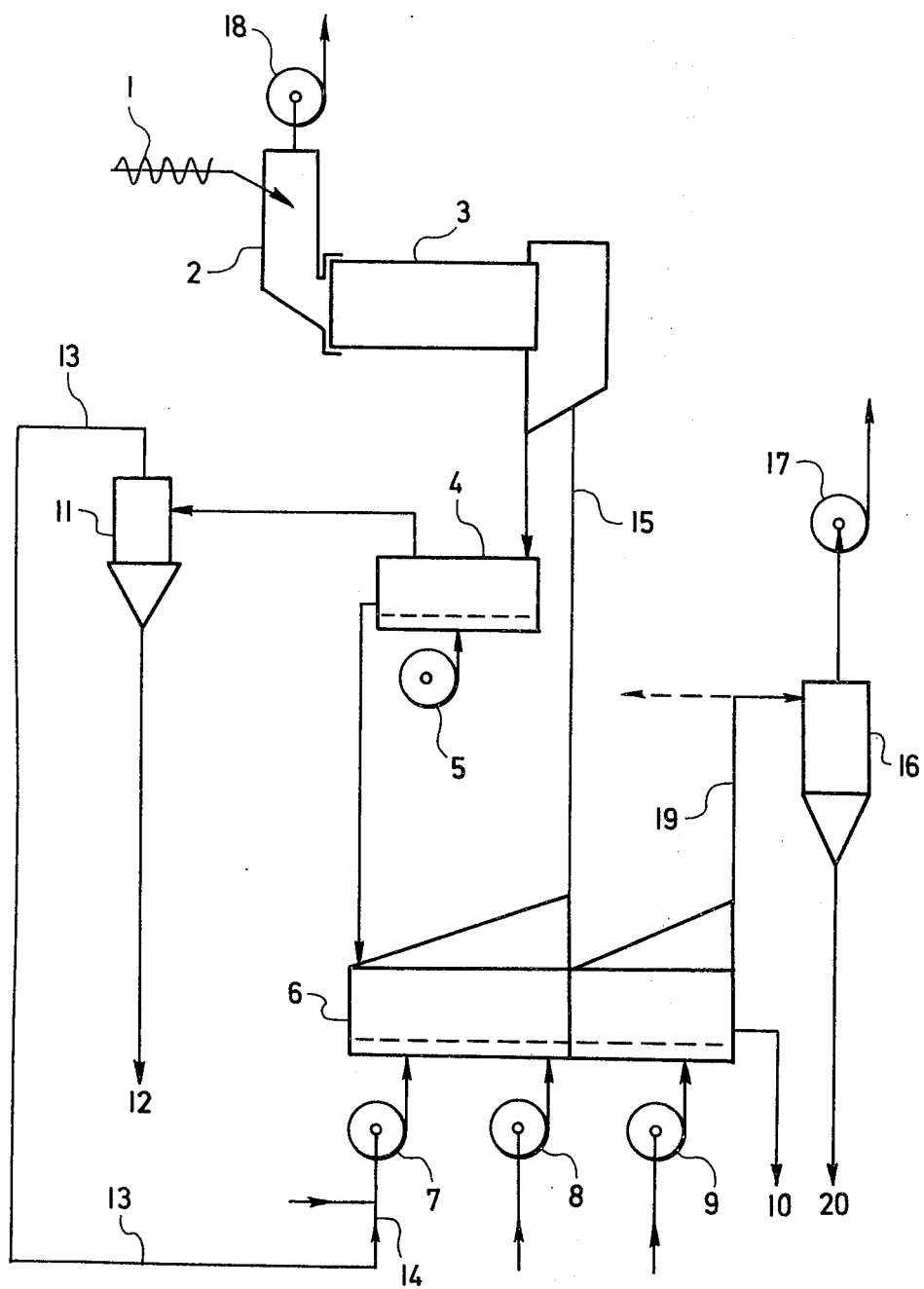

APPARATUS FOR THE MANUFACTURE OF POWDERED LIME

This is a division of application Ser. No. 381,067, filed July 20, 1973, and now abandoned.

BACKGROUND OF THE INVENTION

This invention relates to an apparatus for the manufacture of powdered lime of uniform activity in a short rotary kiln provided in front of its input with a heat exchanger and at its output with a fluid cooling device.

It is common knowledge that in all actually known processes for the manufacture of lime, the burning of lime takes place from the surface of the limestone particle toward its center due to a gradual decomposition of the calcium carbonate or magnesium carbonate to the respective calcium or magnesium oxides with the result that the properties of the lime, so far as individual lime grains are concerned and also the composition in the grains themselves, are substantially different. The decomposition process proceeds in concentric zones toward the center of the grain so that a certain temperature prevails in the decomposition zone, determined by the physical conditions required for decomposition of calcium carbonate, particularly by the partial pressure of carbon dioxide, so that beyond this zone the lime is already burnt and inside, the calcium carbonate is not decomposed. The external hull surrounding the calcium carbonate grain is however exposed to the influence of heat causing its structural changes, particularly in that it shrinks and the free space and the pores between individual crystals of calcium oxide are reduced up to their complete sintering. A consequence of this change is that in the course of treating lime to a lime paste or to a hydrate, it offers worse or better possibilities for penetration of water into the lime grains and between the individual crystals and thus a longer or shorter time is required for completing the reaction of calcium oxide with water to calcium hydroxide. Such a lime is referred to as soft, hard or dead burnt and the degree of burning is called activity, determined by the time required for complete slaking of lime with water and by the maximum temperature of the lime paste.

This circumstance causes the known difficulties with treating of lime. Grains of calcium oxide which did not react with water remain in the lime paste or in the hydrate and cause the so called shooting of plaster or its falling off.

Known processes for the manufacture of lump or piece lime in annular, shaft or also rotary kilns are unable to solve this problem, caused by the burning conditions. The problem is solved subsequently by prescribing long time intervals as long as weeks to let the lime paste mature or only softly burnt lime is processed in hydration units to the hydrate form and the rest of the hard burnt lime is again ground and classified.

SUMMARY OF THE INVENTION

It is an object of the invention to provide an apparatus for the manufacture of powdered lime having a uniform activity so that difficulties arising from the different degrees of burning are eliminated.

According to this invention, powdered lime of uniform activity is manufactured in a rotary kiln with a downward inclination of about 0.5 to about 2.5 percent and which has a profiled lining to retard the advance of the treated material in one or more stages and having a heat exchanger in front of the kiln, by burning in the kiln, the limestone of a grain size of 0 to 2mm with a residue up to 40 percent on a 2mm sieve, sorting out from the burnt lime, in a fluid classifying cell by means of an air stream, one or more fine fraction components up to a grain size limit of for instance about 300 to about 600 microns, above which grain size the burnt powdered lime shows already a uniform activity, whereafter this lime is cooled in a fluid cooler. The heated air from the fluid classifying cell mixed with cooling air in a mixer is supplied to the first section of a fluid cooler in the direction of advance of the powdered lime, the ratio of both air components being adjusted in dependence on the pressure in the upper part of the fluid classifying cell and on the pressure below the grate of the first section of the fluid cooler.

The burning of the preheated powdered limestone is controlled according to the granulometric ratio of individual fractions of the powdered limestone entering the heat exchanger, for instance, by the ratio of grains of the size up to 2mm and above 2mm or according to the reciprocal value of this ratio.

The apparatus according to this invention comprises an inclined rotary kiln provided at its lower end with a burner, engaging into the kiln for two to four times of its diameter and comprising furthermore, a fluid cooler consisting of two or more independent sections with their own fans and having in the upper part of the cooler a first conduit connecting the first up to the last but one sections with the rotary kiln, and a second conduit, connecting the last section with a first separator or alternatively, with the first conduit, with at least one fluid classifying cell of the burnt lime provided in its lower part with a fan inserted between the rotary kiln and the fluid cooler, the fluid classifying cell being connected both to this fluid cooler and to a second separator, the air outlet of the fluid classifying cell being connected via an air mixer with the fan of the first section of the cooler.

The fluid classifying cell can also form the last section of the fluid cooler at its outlet end.

The technological process for the manufacture of powdered lime with uniform activity employing the apparatus according to this invention enables the burning of a limestone raw material having a granulometric composition of 0 to 2000 microns, whereby a maximum of 40 percent of grains can be larger than 2000 microns. Within the range of this granulometric composition, the burning is controlled automatically by readings of an apparatus for determination of the granulometric ratio of individual fractions, or by the reciprocal value of this ratio in the powdered limestone prior to its entrance into the heat exchanger in front of the rotary kiln, in order to obtain a powdered lime of the required activity and efficiency. These readings are transformed to electric impulses, which via electric operating elements, control the electric drives of ventilators, of the supply of fuel oil to the burner, of the rotary kiln and the like, so that the burning process can proceed at conditions corresponding to the optimum adjustment of operating conditions of individual aggregates in order to obtain a powdered lime of the required quality.

The process of manufacture of lime employing an apparatus according to this invention solves the whole problem already in the course of the proper production. It is substantially a process wherein the treated limestone is first ground to a fraction of a grain size of 0 to 2mm followed by burning in a rotary kiln and subsequent classifying in different fraction ranges according to requirements. The proper burning process in a layer in the rotary kiln already reduces substantially any overburning because the individual grains of the limestone are not directly in contact with the hot burning gases as in the case in circular or shaft kilns because they remain in a layer in the lower part of the rotary kiln and with the exception of the surface layer which is exposed to the radiant heat of the flame, they are heated to a certain common temperature, which is inside the layer and is substantially lower than the temperature of the burnt gases in the kiln. Only fine limestone grains are overburnt which reach, in the course of the movement of the limestone layer, the stream of hot burning gases and are taken along by these gases for a certain time. Larger grains are no longer separated from this layer and their burning proceeds in the layer. If there is sorted out from the thus burnt lime several fraction classes, for instance a grain size of 0 to 0.05; 0.05 to 0.1; 0.1 to 0.2mm and so forth, it is found that the finest fractions are burnt hardest and that the burning of coarser particles is accomplished softer up to a certain limit, from which on all burnt grains are burnt to the same hardness and the lime has already a uniform activity, determined by the degree of burning in the kiln. It is generally a lime which is burnt to a soft degree with a high activity without overburnings and with not fully burnt parts concentrated in the centers of the largest lime particles. Due to the maximum size of the majority of the grains, about 2mm of these insufficiently burnt parts are concentrated in particles of the size of a maximum of about 10 millimeters and represent no drawback for processing of the lime.

DESCRIPTION OF DRAWING

The attached drawing shows schematically an apparatus for manufacturing lime according to this invention.

DESCRIPTION OF PREFERRED EMBODIMENT

The apparatus comprises a rotary kiln 3 with a heat exchanger 2 in front of the kiln 3, with feeding devices 1 terminating into the heat exchanger 2. A fan 18 is provided above the heat exchanger 2. The rotary kiln 3, is inclined downwards about 0.5 to 2.5 percent, and is provided with a profiled lining, slowing down the advance of the treated material in one or more stages. The burner of the rotary kiln is inserted into the kiln from its outlet end for two to four times the diameter of the kiln so that the outlet end of the kiln forms a cooling zone, where, due to a narrowing of the free cross section of the kiln approximately in the region of the extremity of the burner and on the outlet from the kiln, the material is retained in order to achieve a better heat exchange and utilization of the heat. The outlet from the rotary kiln 3 is connected to a fluid classifying cell 4, which is in turn connected directly with a fluid cooler 6. The burner of the rotary kiln is designed so as to allow a shaping of the flame by combining the method and amount of supplied combustible matter and air and their ratio and to be able to change the angle between the longitudinal axis of the flame and the longitudinal axis of the kiln. The classifying fluid cell 4 is furthermore provided in its lower part with a fan 5 and its upper part is connected with a separator 11. The fluid cooler 6 consists of two or more independent sections provided with their own fans 7, 8, 9. The air outlet from the separator 11 is connected by a conduit 13 via mixers 14 with the fan 7 of the first section of the fluid cooler in the direction of advance of the powdered lime. The air outlet from the first to the last but one section of the fluid cooler 6 is connected by a conduit 15 with the outlet from the rotary kiln 3. The air outlet from the last section is connected via the conduit 19 with the separator 16, provided with a fan 17 and with the outlet 20. The conduit 19 can be alternately connected with the conduit 15. The limestone, ground to a grain size of 0 to 2mm is dosed by the feeder 1 to the heat exchanger 2 wherefrom it reaches the rotary kiln 3. One or more fluid classifying cells 4 with a fan 5, where the required fine fraction of lime is sorted out by the air stream, is separated in the separator 11 and leaves via the outlet 12 the manufacturing process as the first part of the product. The remaining lime with uniform activity passes thereafter into the fluid cooler 6 consisting of two or more independent sections provided with their own fans 7, 8, 9, where the proper cooling of the lime takes place. The hot air from the fluid classifying cell 4 is thereafter, from the separator 11, supplied to the suction side of the cooling fan 7, where it is mixed with the cooling air in the mixer 14 and is fed to the first section of the cooler. The heated air from the cooler reaches via the conduit 15 as secondary air, the rotary kiln. The air from the last section of the cooler with the fan 9 can be sucked off either together with the other cooling air via the conduit 15 directly into the rotary kiln, or in case of an excess of air for burning, led by way of the fan 17 and over the separator 16 into the ambient space. The second part of the product that is, the lime with uniform activity, leaves the manufacturing process via the outlet from the cooler 10 or as the third part of the product particles retained in the separator 16 on its outlet can be treated independently or can be mixed with the lime from the cooler.

The manufacturing process of lime with uniform activity employing the apparatus according to this invention can also be executed so that the burnt lime leaving by way of the narrowed outlet end of the kiln 3 is supplied alternatively either to the fluid clasifying cell 4 from which one or more lime fractions are subsequently separated by an air stream.

The technological arrangement of the burning according to this invention enables one to achieve a higher heat efficiency than with actually known systems, particularly for units with higher capacity. The daily output of arrangements according to this invention is practically unlimited and outputs of 1000 metric tons per 24 hours can be easily achieved.

What is claimed is:

1. An apparatus for the manufacture of lime of substantially uniform activity comprising a rotary kiln with a downward inclination of about 0.5 to about 2.5 percent, a heat exchanger in front of said kiln, means for feeding ground limestone to the upper end of the rotary kiln through said heat exchanger, at least one fluid classifying cell connected to the outlet of the kiln, said fluid classifying cell having a particle support grate, at least two outlets, a first separator at one outlet of said fluid classifying cell, a fluid cooling device at another output thereof, said fluid cooling device having a particle support grate, comprising at least two sections in series provided with separators, fan means supplying cooling air to said fluid classifying cell and to each section of the fluid cooling device below the grates thereof respectively, a burner extending into the lower end of the kiln a distance from two to four times of the diameter of the kiln, said means for feeding comprising means for supplying ground limestone having a grain size of up to about 2 mm with a residue on a 2mm sieve below about 40 percent to the upper part of the kiln by way of the heat exchanger, means for feeding the burnt lime from said kiln to the fluid classifying cell, said fluid classifying cell separating at least one fraction of a grain size below about 600 microns for feeding to said one outlet thereof, means for feeding the remaining fractions to said fluid cooling device, said first separator separating said fraction from air from said fluid classifying cell as the first part of the product of said apparatus, a first conduit connecting the upper part of the first up to the last but one section of the fluid cooling device with the rotary kiln, a second separator, a second conduit connecting the upper part of the last section of said cooling device with said second separator, the air outlet from said first separator being connected by way of an air mixer with the fan means to the first section of said fluid cooling device below the grate thereof.

2. An apparatus as in claim 1, wherein the fluid classifying cell forms the last section of said fluid cooling device at its outlet end.

* * * * *